United States Patent [19]

Williams

[11] Patent Number: 5,606,379

[45] Date of Patent: Feb. 25, 1997

[54] METHOD FOR RECORDING AND STORING COLOR IMAGES

[75] Inventor: Donald R. Williams, Williamson, N.Y.

[73] Assignee: Eastman Kodak Company, Rochester, N.Y.

[21] Appl. No.: 630,796

[22] Filed: Apr. 10, 1996

[51] Int. Cl.$^6$ ............................ G03B 33/00; G03B 17/32; H04H 1/46

[52] U.S. Cl. ............................ 396/308; 355/32; 358/505; 358/515; 396/305

[58] Field of Search ........................ 354/100, 101, 354/102, 103, 104; 355/32, 35, 36, 37, 38; 358/505, 512, 515, 501, 508, 518, 520

[56] References Cited

U.S. PATENT DOCUMENTS

| | | |
|---|---|---|
| 666,424 | 1/1901 | Ives . |
| 1,689,258 | 10/1928 | Seymour . |
| 1,746,584 | 2/1930 | Fournier . |
| 1,814,672 | 7/1931 | DuPont . |
| 1,989,748 | 2/1935 | Frieser . |
| 3,535,992 | 10/1970 | Goldmark et al. ................ 354/102 |
| 3,572,900 | 3/1971 | Bouche ........................... 354/103 |
| 3,589,811 | 6/1971 | Berger ............................ 355/32 |
| 3,591,268 | 7/1971 | Neale ............................. 354/102 |
| 3,624,278 | 11/1971 | Heckscher ...................... 178/5.2 R |
| 3,881,800 | 5/1975 | Friesem ......................... 350/3.5 |
| 3,911,453 | 10/1975 | Flory ............................. 354/100 |
| 4,926,250 | 5/1990 | Konishi .......................... 358/75 |
| 5,266,805 | 11/1993 | Edgar ............................ 250/330 |

*Primary Examiner*—A. A. Mathews
*Attorney, Agent, or Firm*—Thomas H. Close

[57] ABSTRACT

A method of recording a color image on a monochrome photographic recording medium by the steps of separating the color image into three color components, one luminance component and two chrominance components; and recording the three color components on adjacent areas of the recording medium, the luminance component being recorded on a larger area than either of the two chrominance components.

6 Claims, 2 Drawing Sheets

METHOD FOR RECORDING AND STORING COLOR IMAGES

FIELD OF THE INVENTION

The invention relates generally to a method of recording and storing color image information in a human readable fashion onto archival monochrome film for more convenient retrieval with either analog or digital techniques.

BACKGROUND OF THE INVENTION

Properly processed and stored, monochrome (e.g. Black and White silver halide) film continues to meet both legal and archival standards for the long term storage of information. This has in fact buoyed its continued use despite competition from digital imaging technologies such as magnetic and optical storage over the last decade. It is clear that monochrome silver halide film will continue to serve a vital role in the archival storage of information. Its human readable form is especially important in its acceptance since it immunizes it against digital format obsolescence which threatens to be the bane of digital storage techniques.

However, because monochrome film only yields monochromatic information on output, typical single channel recording methods lose all color information content of the original document. This problem is easily, but inconveniently, solved in the existing art with monochrome films by resorting to classical three channel separation techniques. This involves the recording of the original image onto monochrome film through three separate color filters, nominally red(R), green(G) and blue(B), thus arriving at three distinct and disjoined image frames or field-of-views (FOV); one for each color. For example, see U.S. Pat. No. 3,589,811 issued Jun. 29, 1971 which discloses the use of crossed beam splitters in a camera for recording three color separation images on a monochrome film.

A reconstructed image with color information can then be retrieved from these three records by reversing the process, with special attention paid to spatial registration of the records. Because each frame is separate and disjoined from members of its triad, the reconstruction process can become cumbersome due to handling and alignment issues.

U.S. Pat. No. 4,926,250 issued May 15, 1990 to Konishi discloses a color image recording and reproducing apparatus using monochromatic recording medium. The separate frames are optically recorded on microfilm and a blip mark adjacent each frame is recorded to indicate the color of the separation. The blip marks are employed in reproduction apparatus to select the color of the toner or paper, but no attempt is made to register multiple color separations in the output apparatus.

Existing film scanning apparatus is configured to scan a single image in a single optical field of view (FOV). The necessity of scanning three color separations to reproduce a color image recorded on a monochromatic film in the conventional manner reduces the productivity of such scanning apparatus by a factor of three.

It is also well known in the art that there is less visible information in the red and blue separations than in the green separation. Thus, a method that employs the same amount of recording medium for the red, blue and green separations is inefficient.

There exists a need therefore for an improved method of recording a color image on a monochromatic recording medium.

SUMMARY OF THE INVENTION

The present invention is directed to overcoming one or more of the problems set forth above. Briefly summarized, according to one aspect of the present invention, a spatial formatting method allowing for the convenient and efficient storage, retrieval, and reconstruction of color separation information within a single optical field-of-view (FOV) is claimed. It does so by adjoining color records within a constrained and standardized two-dimensional spatial format, with the luminance record occupying a larger portion of the FOV than the chrominance portions of the image. The method of the present invention offers the advantage of unifying color records into any single standardized FOV, and providing greater storage efficiency through use of low resolution non-luminance records. In particular, the invention provides a method of recording a color image on a monochrome photographic recording medium by the steps of separating the color image into three color components, one luminance component and two chrominance components; and recording the three color components on adjacent areas of the recording medium within a standard image format, the luminance component being recorded on a larger area than either of the two chrominance components.

The advantage of this form of storage is its human readability and archival legality. Since most film scanning hardware is designed to accommodate standardized formats within a single FOV, efficiency is increased by retrieving all color separation information in a single scan.

Parenthetically, it can be noted that the green record of the red-green-blue color separation triad is most important of the three for both tone reproduction and spatial resolution. This is largely due to its strong correlation with luminance. It is in fact well accepted in the art that the non-luminance red and blue records can generally be of half the spatial resolution of the green record yielding an imperceptible loss in image quality upon color reconstruction compared to equal spatial resolution in all three channels.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
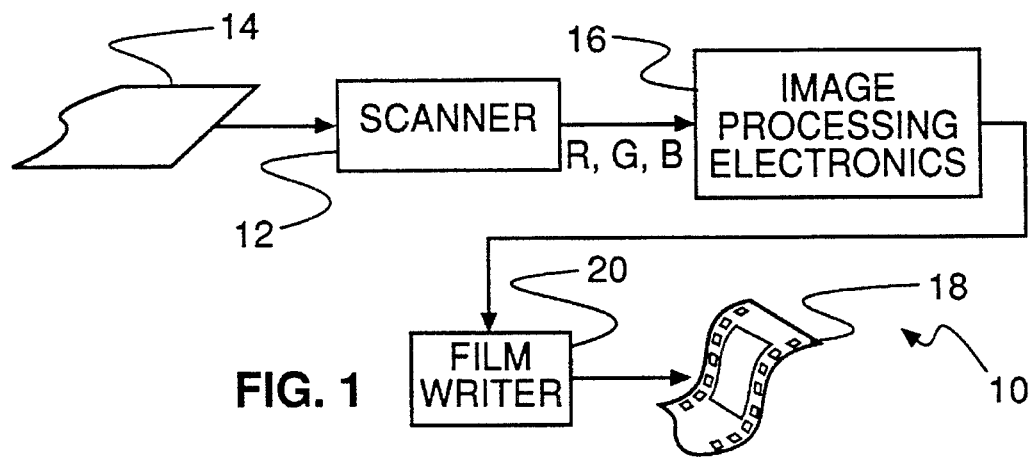
FIG. 1 is a schematic block diagram of an image processing system suitable for practicing the present invention.

An example of a system for recording a color image on a monochrome film according to the present invention is shown in FIG. 1. The system generally designated 10 includes a scanner 12 for scanning an original color image 14 to produce a color digital image signal R,G,B. The original color image 14 may comprise an original scene, a color image on color photographic film or paper, or a color image generated by a computer. The scanner may comprise, for example a digital color camera, a color scanner, or other such digital color image capture device.

Figure 2:
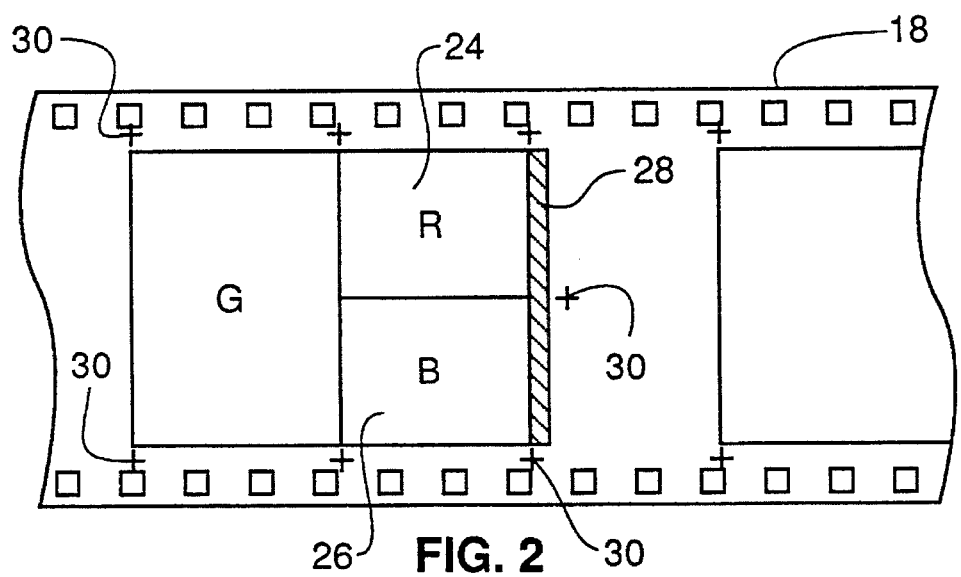
FIG. 2 is a plan view of a recording medium bearing a color image recorded according to the present invention.

The color digital image is processed in image processing electronics 16, such as a personal computer or special purpose digital signal processing hardware, to produce a digital image file for printing the color digital image onto monochrome film 18 in a film writer 20. As shown in FIG. 2, the image written onto the film 18 by film writer 20 includes a luminance subsection 22 and a pair of chrominance subsections 24 and 26, all within a standard image format. For example, the image format may be a standard 35 mm rectangular format of 24 mm×35 mm, wherein the luminance subsection 22 occupies a 24 mm×16.5 mm area, and the two chrominance subsections 24 and 26 occupy contiguous 17.5 mm×12 mm areas. With these dimensions, a 1 mm strip 28 is left along one edge of the standard 35 mm FOV. The luminance subsection may represent, for example, a green color component and the chrominance components may represent red and blue respectively. Though the red, green, and blue records are considered nominal separation standards for storage of color information, other similar standards such as Ycc, Lab, or Luv can also be stored in a similar fashion as in FIG. 1. The luminance information (Y, L, and L respectively) of each would be recorded at full resolution while the chroma information (cc, ab, and uv) would be recorded similar to red and blue at a reduced resolution.

This example also shows the reduced resolution channels for non-luminance color information, red and blue in this case. Retrieval via digital electronic scanners is preferred because of the added flexibility afforded by digital data for the geometric operations such as rotation, shift, and scaling required for image registration. However, this format does not preclude the use of purely optical retrieval methods which can perform these same operations albeit in a less accurate fashion. Fiducial marks 30 may be provided at the periphery of the subsections of the image to aid in recovery of the color records in a digital scanner.

Figure 3:
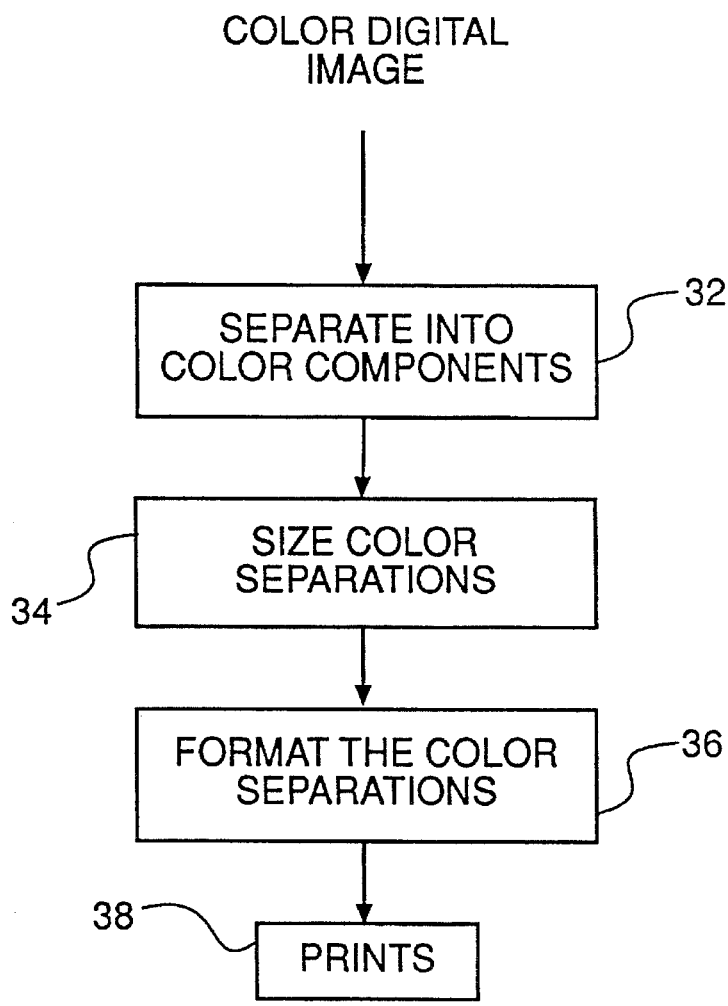
FIG. 3 is a flow chart showing the image processing steps performed by the image processing electronics.

Referring now to FIG. 3, the steps performed by the image processing electronics 16 will be described. First, the digital image is separated (32) into color components. This may simply involve separating the red, green and blue color records if the scanner output was an R,G,B color signal, or it may involve a color space transformation to another desired color space such as Luv, Lab or YCC as is well known in the prior art.

Next, the color separations are sized (34) to fit into the standard format. This step may involve decimation and interpolation as is well known in the prior art. The sized color separations are then formatted (36) into a single image by rotating and arranging them in the orientation in which they will appear in the standard frame. Fiducial marks and or a filler strip 28 including image related information may be added to the digital image at this time. To insure proper tone reproduction upon retrieval and reconstruction, a stepped gray scale may be included in the filler strip 28. Finally, the digital image is sent (38) to the film writer 20, where it is recorded on the film 18.

Figure 4:
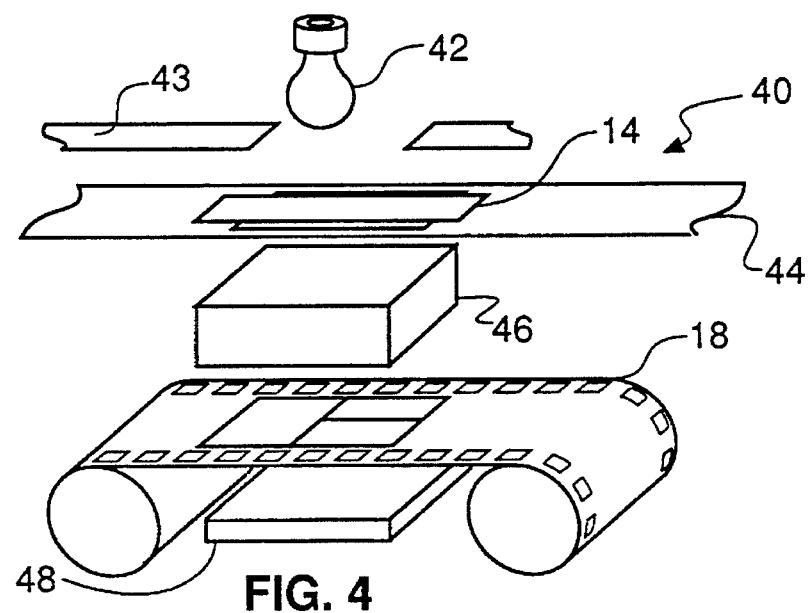
FIG. 4 is a schematic diagram illustrating an alternative apparatus for optically recording a color image on monochromatic film according to the present invention.

As shown in FIG. 4, when the original image is a color photographic film 14, the monochrome image according to the present invention may be produced by optical recording techniques rather than digital image processing. The optical recording apparatus 40, resembling a standard photographic printer, would include a light source 42, a shutter 43, a film gate 44 for holding the film 14, a lens and filter housing 46 containing appropriate color filters, prisms, and lenses having magnification ratios to produce the monochrome image, and a film gate 48 for holding the monochrome film 18. A mask (not shown) may be provided for producing the several fiducial marks superimposed at the recording stage to allow for easy registration upon retrieval and reconstruction.

Figure 5:
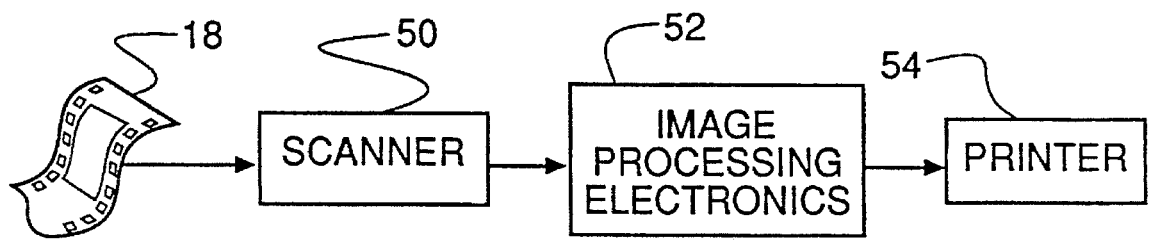
FIG. 5 is a schematic diagram of a color image reproduction system employing a monochromatic film image according to the present invention.

By far, the preferred retrieval approach for subsequent reconstruction lies in electronically scanning the color separations in their adjoined arrangement and reconstructing the image digitally. As shown in FIG. 5, this is done with a single scan in a monochrome scanner 50 covering the standardized image frame containing all three adjoined separations.

With a priori knowledge of the format, the digital image processing electronics 52 reverses the capture process by segmenting the image into its color separations using pattern recognition to recognize the fiducial marks, removing the fiducial marks and the image related information in the strip 28, rotating and resizing the separations, and combining the separations into one color digital image file suitable for printing on a printer 54 such as a thermal, ink jet, electrophotograhic or digital silver halide printer.

The invention has been described with reference to a preferred embodiment. However, it will be appreciated that variations and modifications can be effected by a person of ordinary skill in the art without departing from the scope of the invention.

PARTS LIST
10 system for recording color images on monochromatic film
12 scanner
14 original color image
16 image processing electronics
18 monochrome film
20 film writer
22 luminance subsection
24 chrominance subsection
26 chrominance subsection
28 filler strip
30 fiducial marks
32 separate color components step
34 size color separations step
36 format color separations step
38 print step
40 optical recording apparatus
42 light source
43 shutter
44 film gate
46 filter housing
48 film gate
50 scanner
52 image processing electronics
54 printer

I claim:

1. A method of recording a color image on a monochrome photographic recording medium, comprising the steps of:

a. separating the color image into three color components, one luminance component and two chrominance components; and b. recording the three color components on adjacent areas of the recording medium, the luminance component being recorded on a larger area than either of the two chrominance components.

2. The method of recording claimed in claim 1, wherein the combined recording areas fall within a standard image format.

3. The method of recording claimed in claim 1, further comprising the step of recording fiducial marks to indicate the location of the respective color components on the recording medium.

4. The method of recording claimed in claim 1, wherein the steps of separating the color image into color components and recording the color components is performed optically and the color components are red, green and blue, the green component being the luminance component.

5. The method of recording claimed in claim 1, wherein the step of separating the color image into color components is performed with a scanner to produce a digital color image having color components; the step of recording the color components is performed with a digital film writer.

6. The method of recording claimed in claim 5, wherein the color components are L, a, b.

* * * * *